US 8,724,553 B2

(12) United States Patent
Weniger et al.

(10) Patent No.: US 8,724,553 B2
(45) Date of Patent: **\*May 13, 2014**

(54) ROUTE OPTIMIZATION WITH LOCATION PRIVACY SUPPORT

(75) Inventors: Kilian Weniger, Langen (DE); Jens Bachmann, Langen (DE)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/565,498

(22) Filed: Aug. 2, 2012

(65) Prior Publication Data

US 2012/0297186 A1 Nov. 22, 2012

Related U.S. Application Data

(62) Division of application No. 12/159,715, filed as application No. PCT/EP2007/001631 on Feb. 26, 2007, now Pat. No. 8,259,649.

(30) Foreign Application Priority Data

Feb. 28, 2006 (EP) .................................. 06004039

(51) Int. Cl.
*H04W 4/00* (2009.01)
(52) U.S. Cl.
USPC .............................. 370/328; 370/349; 370/392
(58) Field of Classification Search
None
See application file for complete search history.

(56) References Cited

U.S. PATENT DOCUMENTS

| 2003/0211842 | A1* | 11/2003 | Kempf et al. ................. 455/411 |
| 2004/0100951 | A1 | 5/2004 | O'neill |
| 2004/0114558 | A1 | 6/2004 | Krishnamurthi |
| 2004/0236937 | A1 | 11/2004 | Perkins |
| 2005/0041675 | A1 | 2/2005 | Trostle |

FOREIGN PATENT DOCUMENTS

| EP | 1 401 173 | 3/2004 |
| JP | 2004-112727 | 4/2004 |
| WO | 03/041358 | 5/2003 |
| WO | 03/044626 | 5/2003 |
| WO | 2004/010668 | 1/2004 |
| WO | 2004/043010 | 5/2004 |
| WO | 2004/055993 | 7/2004 |

OTHER PUBLICATIONS

Japanese Office Action dated Apr. 13, 2012 with English translation.
European Search Report dated Oct. 25, 2006.
J. Jiang, et al., "A novel mix-based location privacy mechanism in Mobile IPv6," Computers and Security, vol. 24, No. 8, XP005184775, Nov. 2005, pp. 629-641.
Y. Qiu, et al., "Protocol for Hiding Movement of Mobile Nodes in Mobile IPv6," IEEE $62^{nd}$ Vehicular Technology Conference, XP002404331, Sep. 25, 2005, pp. 812-815.

(Continued)

*Primary Examiner* — Srinivasa Reddivalam
(74) *Attorney, Agent, or Firm* — Dickinson Wright PLLC (57) ABSTRACT

The invention relates to a method for route optimisation of packet switched data transmissions between a first mobile node and a second mobile node in a mobile communication system comprising a plurality of access networks. The method comprises the step of transmitting return routability protocol packets and data packets. The return routability protocol packets and data packets are analysed, and at least part of an address comprised in headers of the return routability protocol packets and data packets is removed.

7 Claims, 7 Drawing Sheets

(56) References Cited

OTHER PUBLICATIONS

D. Johnson, "Mobility Support in IPv6," IETF RFC 3775, Jun. 2004, pp. 1-165.

H. Soliman, et al., "Hierarchical Mobile IPv6 Mobility Management (HMIPv6)," IETF RFC 4140, Aug. 2005, pp. 1-29.

G. Krishnamurthi, et al., "Providing End-to-End Location Privacy in IP-based Mobile Communication," WCNC IEEE Communications Society, Mar. 2004, pp. 1264-1269.

R. Wakikawa, et al., Optimized Route Cache Protocol (ORC), IETF Internet Draft, draft-wakikawa-nemo-orc-01.txt, Oct. 24, 2004, pp. i, 1-22.

P. Thubert, et al, "Global HA to HA Protocol," IETF Internet Draft, draft-thubert-neuro-global-haha-00, Oct. 5, 2004, pp. 1-22.

J. Zhang, et al., "Agent-Based Return Routability Test for Moble IPv4 Route Optimization," draft-zhang-mobopts-agent-rnip4rr-00.txt, Aug. 10, 2005, pp. 1-18.

International Search Report dated Jun. 28, 2007.

O. Gonzalez et al, "Study and evaluation of mobility management for the IP-based IMT platform (IP<2>) architecture," Vehicular Technology Conference, 2003. VTC 2003-Fall.2003 IEEE 58th Orlando, FL, USA Oct. 6-9, 2003, Piscataway, NJ, USA,IEEE, US, Oct. 6, 2003, pp. 1954-1958, XP010702247 ISBN: 0-7803-7954-3.

F.Zhao et al., Extensions on Return Routability Test in MI P6: draft-zhao-mip6-rr-ext-01, Feb. 21, 2005, whole document.

* cited by examiner

ROUTE OPTIMIZATION WITH LOCATION PRIVACY SUPPORT

This is a divisional application of application Ser. No. 12/159,715 filed Jun. 30, 2008, which is a national stage of PCT/EP2007/001631 filed Feb. 26, 2007, which is based on European Application No. 06004039.1 filed Feb. 28, 2006, the entire contents of each of which are incorporated by reference herein.

BACKGROUND OF THE INVENTION

1. Field of the Invention

The invention is related to mobile communication systems. More specifically it relates to location privacy and route optimisation for mobile communication based on the Mobile Internet Protocol (Mobile IP) or similar protocols.

2. Description of the Related Art

The invention is described for the example of the Mobile Internet Protocol version 6 (Mobile IPv6). It is, however, also applicable to other protocols defining equivalent entities corresponding to the described entities of the Mobile IP.

Mobile IPv6 currently defines two modes of operation: bi-directional tunnelling and route optimization. While the former mode requires all data packets to be routed over the home agent of the sending mobile node, the latter utilizes the direct path between mobile node and correspondent.

Route optimization mode is more efficient and reduces the packet delay, which is very important for scalability of Mobile IPv6 and for supporting interactive communication. However, it does not provide location privacy with respect to the communication partner, which knows where the mobile node is currently located. In contrast, bi-directional tunnelling provides location privacy, but is less efficient and may delay packets to an extent that is not acceptable for delay-sensitive applications.

Communications systems evolve more and more towards an Internet Protocol (IP)-based network. They consist of many interconnected networks, in which speech and data is transmitted from one terminal to another terminal in pieces, so-called packets. Those packets are routed to the destination by routers in a connection-less manner.

Therefore, packets consist of IP header and payload information and the header comprises among other things source and a destination IP address. For scalability reasons an IP network uses a hierarchical addressing scheme. Hence, an IP address does not only identify the corresponding terminal, but additionally contains location information about this terminal. With additional information provided by routing protocols, routers in the network are able to identify the next router towards a specific destination.

If a terminal is mobile, from now on called Mobile Node (MN), and moves between subnets, it must change its IP address to a topologically correct one because of the hierarchical addressing scheme. However, since connections on higher-layers, such as TCP connections, are defined with the IP addresses (and ports) of the communicating nodes, the connection breaks if one of the nodes changes its IP address, e.g., due to movement.

Mobile IPv6 [D. Johnson, C. Perkins, J. Arkko, "Mobility Support in IPv6", IETF RFC 3775, June 2004] is an IP-based mobility protocol that enables MNs to move between subnets in a manner transparent for higher layers and applications, i.e. without breaking higher-layer connections. Therefore, a MN has two IP addresses configured: a Care-of-Address (CoA) and a Home Address (HoA). The MN's higher layers use the HoA for communication with the communication partner (destination terminal), from now on called Corresponding Node (CN). This address does not change and serves the purpose of identification of the MN. Topologically, it belongs to the Home Network (HN) of the MN. In contrast, the CoA changes on every movement resulting in a subnet change and is used as the locator for the routing infrastructure. Topologically, it belongs to the network the MN is currently visiting. One out of a set of Home Agents (HA) located on the home link maintains a mapping of the MN's CoA to MN's HoA and redirects incoming traffic for the MN to its current location. Reasons for having a set of HAs instead of a single HA are redundancy and load balancing.

As stated above, Mobile IPv6 currently defines two modes of operation: bi-directional tunnelling and route optimization. If bi-directional tunnelling is used, data packets sent by the CN and addressed to the HoA of the MN are intercepted by the HA in the HN and tunnelled to CoA of the MN. Data packets sent by the MN are reverse tunnelled to the HA, which decapsulates the packets and sends them to the CN. For this operation, only the HA must be informed about the CoA of the MN. Therefore, the MN sends Binding Update (BU) messages to the HA. These messages are sent over an IPsec security association and thus are authenticated and integrity protected. Since the CN is not aware of the CoA of the MN, it cannot derive the location of the MN and, thus, location privacy is provided. However, if the MN is far away from the home network and the CN is close to the MN, the communication path is unnecessarily long, resulting in inefficient routing and high packet delays.

The route optimization mode can prevent this inefficiency by using the direct path between CN and MN. Therefore, the MN sends BU messages to the CN, which then is able to directly send data packets to the MN (a type 2 routing header is used to send the packets on the direct path). Of course, the CN has to implement Mobile IPv6 route optimization support. To authenticate the BU message, the MN and the CN perform a so-called return routability procedure, which tests the reachability of the MN at the HoA and CoA and generates a shared session key. However, since the CN learns the CoA of the MN by means of the BU message, it can derive its location, i.e. location privacy is not provided.

A mechanism that provides both location privacy and route optimization is certainly desirable, since interactive applications such as VoIP require short packet delays. The mechanism should support scenarios where two mobile nodes communicate, where both MNs hide their location from each other (bi-directional location privacy).

In the following, prior art documents that can provide route optimization and/or location privacy to some extent and the drawbacks of those solutions are discussed.

HMIP [Hesham Soliman, Claude Catelluccia, Karim El Malki, Ludovic Bellier, "Hierarchical Mobile IPv6 mobility management (HMIPv6)", IETF RFC4140, August 2005] was developed to reduce the latency and signalling overhead occurring due to sending BU messages to (potentially far away) HAs. It is proposed to handle the mobility partly locally. Therefore, a hierarchy of Mobility Anchor Points (MAP) is introduced in the visited network. The MN only needs to register its CoA with the local MAP. An additional CoA, the so-called Regional CoA (RCoA), is obtained from the MAP's subnet and used by the MAP to hide the MN's mobility within the MAP's region from the HA (or the CN in case of route optimization). Furthermore, MN can start Route Optimization mode using the RCoA as CoA. Hence, some support for route optimization and location privacy can be provided, but since CN still knows the RCoA and hence the MAP region the MN is currently located in, location privacy support is very limited.

AREC [WO2004055993] [G. Krishnamurthi, H. Chaskar, R. Siren, "Providing End-to-End Location Privacy in IP-based Mobile Communication", IEEE WCNC, March 2004] requires modification of every Access Router (AR) of every visited network. Binding information is sent from HAs to ARs of the CN and MN, respectively, and data packets are tunnelled between the ARs of MN and CN without involvement of the HAs. This way, the direct, i.e. shortest, route between MN and CN is used and location privacy is supported. In WO2004010668 a very similar approach is presented. However, the distribution of binding information from the HAs to the ARs requires a new complex protocol, which would have to be standardized.

DRC [Ryui Wakikawa, "Optimized Route Cache Protocol (ORC)", Internet Draft draft-wakikawa-nemo-orc-01.txt, October 2004] was developed for route optimization in mobile networks (NEMO) and requires modifications to edge routers of visited networks, including the provision of binding information. The MN tunnels data packets to the edge router of CN's current network (assuming that CN is mobile) and the CN can tunnel data packets to the edge router of MN's current visited network. To be able to tunnel the packets to the edge routers, each node needs to know the IP address of the correspondent edge router, which again reveals location information about CN, i.e., location privacy support is uni-directional, not bi-directional.

GlobalHAHA [P. Thubert, R. Wakikawa, V. Devarapalli, "Global HA to HA protocol", IETF Internet Draft draft-thubert-nemo-global-haha-00, October 2004] allows the distribution of HAs in the Internet that are usually bound to the home link by letting multiple HAs advertise routes to the home network prefix from different topological locations. A MN can bind to the closest HA, which serves as proxy HA, resulting in an optimized route. Location privacy is given, if bi-directional tunnelling is used. Hence, simultaneous route optimization and location privacy is provided. However, if all visited network advertise routes to all other networks (all being home networks for some MNs), routing scalability issues may arise, since the address hierarchy is basically not given anymore. Furthermore, the distributed home network must manually be configured as such. A secure on-demand configuration is not supported and would require a new complex protocol, which would need to be standardized.

In WO03041358 so-called Location Privacy Agents (LPA) and Location Privacy Servers (LPS) are introduced in every network. The MN sends a location privacy request message to its LPA, which then selects an LPA that is close to the CN. The address of this LPA is then given to the MN, which then sends a BU message to this LPA. Hence, the approach is similar to the ORC approach: since the LPA is close to CN's network, it knows the location of CN to some extend, which breaks location privacy support if the CN is mobile. Moreover, this solution would require a new signalling protocol.

In US2005041675 and WO2004043010 location privacy is achieved by cryptographically modified prefixes of IP addresses. Since the prefix is usually used by a router to route IP packets, this approach requires the modification of all routers in the Internet or can only provide limited location privacy.

In WO03044626, multicast addresses are used as CoA. Since they do not include any location information, location privacy support is given even in route optimization mode. However, this solution does not scale with the number of MNs, since a large-scale deployment would result in a flat routing in the Internet.

In [J. Zhang, D. Pearce, "Agent-Based Return Routability Test for Mobile IPv4 Route Optimization", IETF Internet Draft draft-zhang-mobopts-agent-mip4rr-00.txt, August 2005], it is proposed to adopt the MIPv6 route optimization scheme for MIPv4 route optimization. A Correspondent Agent (CA) is introduced that proxies the ON in terms of return routability. This way the ON implementation does not need to be modified and data packets can directly be tunnelled between MN and CA. A side effect of the CA is that MN's location is hidden from CN. This approach is similar to ORC. Hence, ON's location is revealed to MN if CN is mobile and location privacy support is uni-directional only.

The problem to be solved is the provision of simultaneous location privacy and route optimization for Mobile IPv6-based communication without requiring the introduction of a new, to-be-standardized signalling protocol and with as few changes to terminal and network device implementations as possible. This would significantly ease deployment.

SUMMARY OF THE INVENTION

The object is solved by the subject matters of the independent claims. Advantageous embodiments of the invention are subject matters to the dependent claims.

To achieve this object, the present invention provides a method, apparatus, system and computer-readable medium for route optimisation of packet switched data transmissions between a first mobile node and a second mobile node in a mobile communication system comprising a plurality of access networks. Return routability protocol packets and data packets are transmitted. The return routability protocol packets and data packets are analysed, and at least part of an address comprised in headers of the return routability protocol packets and data packets is removed.

According to an advantageous embodiment addresses are derived, by a transformation rule, without location information from the address comprised in the headers and the address comprised in the headers is substituted with the address without location information.

In another embodiment of the invention the address is a care-of address in an internet protocol header of care-of test initiation messages or binding update messages.

In a further embodiment the analysing and removing steps are carried out by a first access router in a source address field of the internet protocol header.

Another advantageous embodiment further comprises substituting the care-of address back into the headers after the analysing and removing steps.

In another embodiment of this invention the transformation rule comprises adding a bit to the care-of address.

In another advantageous embodiment the first mobile node calculates a first authenticator in a binding update message using the address without location information.

According to another advantageous aspect of the invention a second access router replaces a second authenticator in a binding update message by a first authenticator calculated using the address without location information.

Another embodiment of the invention further comprises the steps of setting a first flag by the first mobile node in a home test initiation message indicating a requirement for location privacy; and setting a second flag in the home test initiation message by the second access router indicating whether it is adapted to carry out the analysing and removing steps.

An advantageous aspect of the invention further comprises the steps of: setting a privacy flag by the first mobile node marking a care-of test initiation message for which the removing step is to be carried out, and identifying by the first access router return routability protocol packets and data packets that require substitution of a care-of address with a home address.

In another embodiment of the invention a third flag is set by the first and second access router indicating whether it can carry out the analysing and removing steps; the first and second access router maintain information on the state of the flag of the second and first access router, respectively; and a mobile node's home agent sets a fourth flag by in a home test message or home test initiation message indicating a requirement for location privacy.

When the second mobile node moves to another access network it is an advantage that state information regarding the second mobile node from is transferred from a first access router to a third access router.

According to another advantageous embodiment of the invention the second mobile node sends a binding refresh request message to the first mobile node when the second mobile node moves to another access network.

In another advantageous embodiment of the invention a second mobile node carries out the steps described for a first mobile node above.

Another advantageous embodiment of the invention relates to a mobile communication system comprising a plurality of access networks for route optimization of packet switched data transmissions between a first mobile node (100) and a second mobile node (106), the first mobile node (199) being adapted to transmit return routability protocol packets; and a first access router (202) adapted to analyse the return routability protocol packets and data packets and remove at least part of an address comprised in headers of the return routability protocol packets and data packets.

Another embodiment of the invention relates to a mobile node in a mobile communication system comprising calculating means for calculating a first authenticator in a binding update message using an address without location information.

A further embodiment of the invention relates to an access router in a mobile communication system comprising a plurality of access networks, the access router comprising analyzing means adapted to analyze return routability packets and data packets; and substituting means adapted to remove at least part of an address comprised in headers of the return routability protocol packets and data packets.

A further embodiment of the invention relates to a computer readable medium storing instructions that, when executed by an access router, cause the access router to optimize a route of packet switched data transmissions between a first mobile node and a second mobile node in a mobile communication system comprising a plurality of access networks, by analyzing return routability protocol packets and data packets and removing at least part of an address comprised in headers of the return routability protocol packets and data packets.

BRIEF DESCRIPTION OF THE DRAWINGS

The accompanying drawings are incorporated into and form part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

This invention proposes a mechanism that provides location privacy (i.e., hides the mobile node's location from the correspondent node) and route optimization simultaneously. The mechanism only requires minimal changes to the Mobile IPv6 protocol and is based on the return routability procedure.

Note that different types of location privacy can be distinguished. The one this invention aims at is hiding the MN's location (and thus CoA) to the CN. Other types are hiding the location to eavesdroppers or preventing tracking of the MN's location.

The solution provides bi-directional location privacy, i.e., the location is hidden in both directions if both communication partners are mobile. The solution provides the same level of security as standard Mobile IPv6.

The main idea of this invention is to add location privacy support to the MIPv6 Route Optimization mode by extending AR (Access Router) functionality: ARs monitor return routability protocol and data packets and substitute (parts of) addresses in IP headers, which contain location information. If both ARs are involved in the process, location privacy support is bi-directional, i.e., in case two mobile nodes communicate with each other, none of the mobile nodes is able to determine the location of the other. Since the return routability protocol is used and no modifications are necessary to the protocol messages itself, no new protocol needs to be developed, standardized, and introduced in network or terminal devices, which significantly eases deployment. Two solution variants are proposed, one requires more processing at the ARs, but no changes to MN implementations and the other one requires changes to MN implementations, but less processing at the ARs.

In other words, ARs replace CoAs (Care-of Addresses) in the IP header of return routability protocol and data packets with addresses which do not contain location information. A CoA without location information in this context, from now on called CoAx, can be derived from a CoA using a well-known transformation rule. Since only the prefix of an address contains location information, the rule can, e.g., be to just set the prefix of the CoA to a well-known value such as 0.

In the following we assume a scenario where both communication partners are mobile and are away from home. If a MN is at home, it does not need to trigger route optimization (the route is already the shortest). For support of legacy stationary CNs (Correspondent Nodes), see below.

Figure 1:
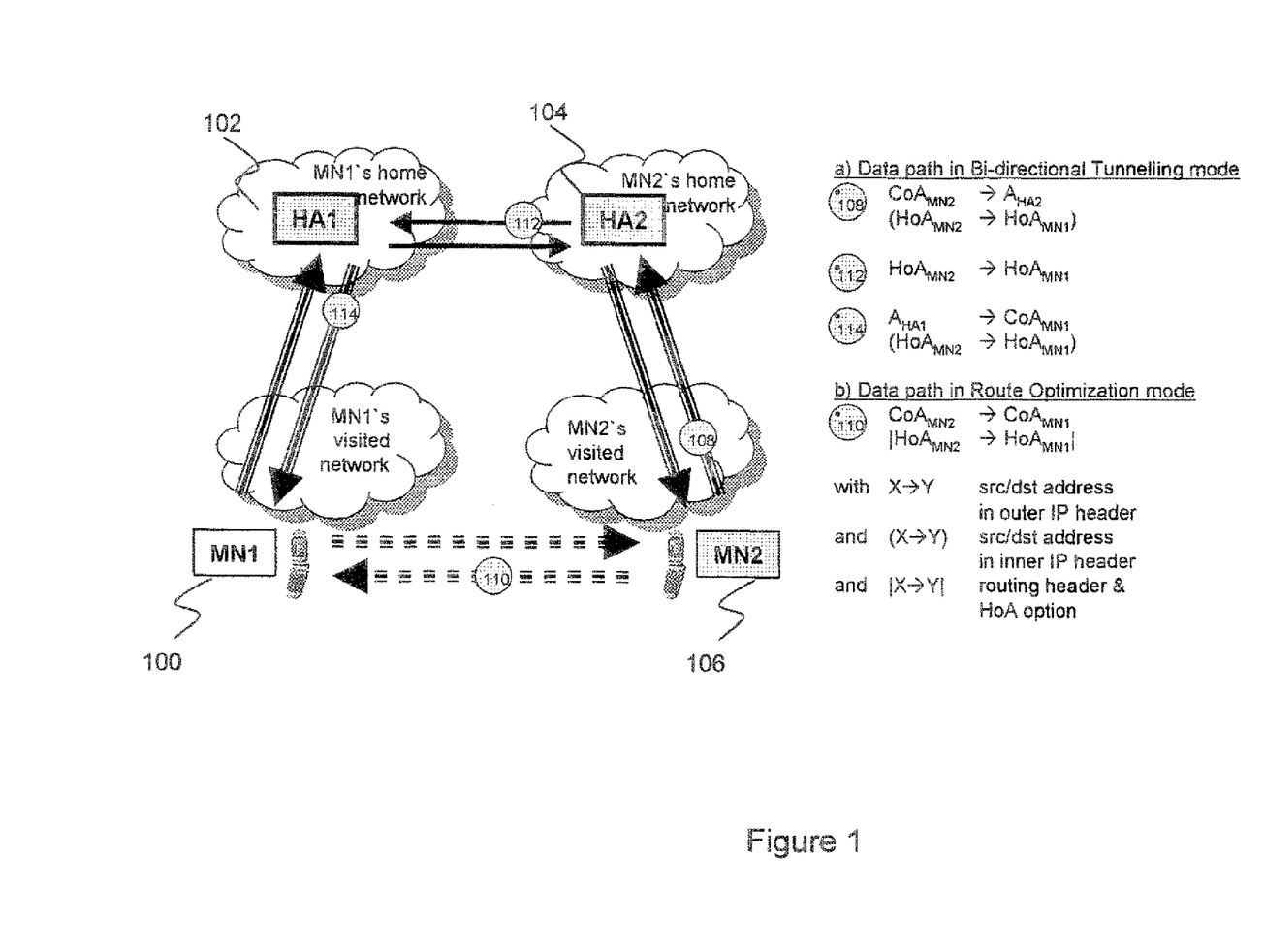
FIG. 1 shows the data path if Mobile IPv6 bi-directional tunnelling or route optimization mode is used (prior art)
Figure 2:
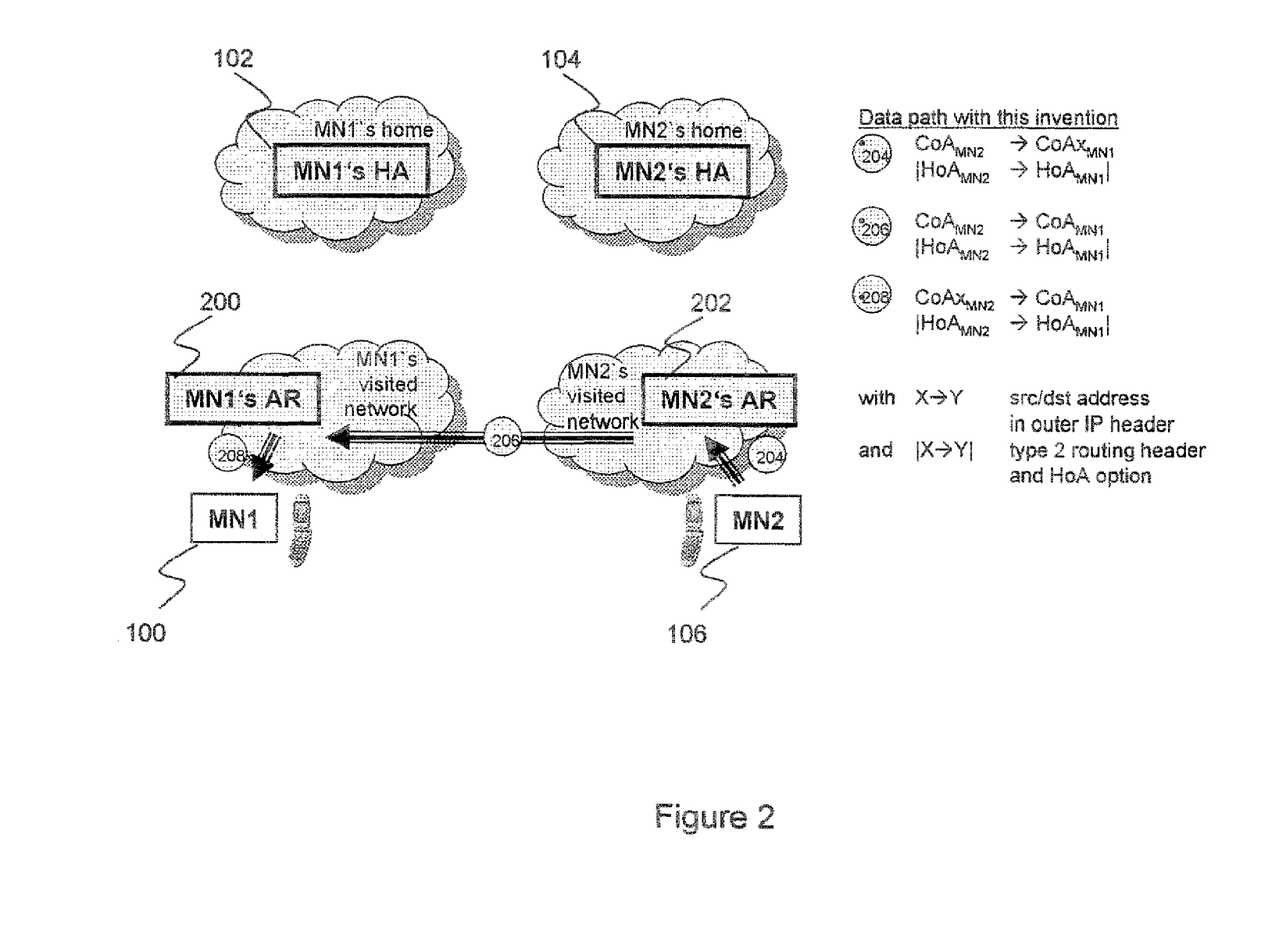
FIG. 2 illustrates the data path if the mechanism defined in this invention is used.

FIG. 2 shows the data path and addresses in IP headers of data packets if this invention is implemented. Compared to standard Mobile IPv6 bi-directional tunnelling or route optimization mode (see FIG. 1), the path length is as short as in route optimization mode.

The Return Routability Procedure

A MN (Mobile Node) 100 initiates the return routability procedure by sending a HoTi (Home Test init) message, which is reverse tunnelled over the HA (Home Agent) 102. The HoTi message contains a cookie to be able to map replies to requests. CN 106 replies with so-called HoT (Home Test) messages, which contains a cookie, a nonce index and a home keygen token, which is calculated with a keyed hash function from the HoA and a nonce. In parallel or subsequent to this exchange, the MN 100 sends a CoTi (Care-of Test init) message on the direct path to the CN 106. The CoTi contains a cookie as well and CN 106 replies with a CoT (Care-of Test) message, which contains the cookie, a nonce index and a care-of keygen token, which is calculated with a keyed hash function from the CoA and a nonce. The key for the hash function and the nonce are only known by the CN 106. After MN 100 has received both HoT and CoT messages, it calculates a binding key, which is the hash value of the concatenation of the keygen tokens in HoT and CoT messages.

Hence, the correct binding key can be calculated only by entities that have received both HoT and CoT messages. Since both messages are sent on different path, the attacker would have to be located on both path or on the joint path (close to CN/MN).

Next, the MN 100 calculates an authenticator using a hash function keyed with the binding key. The authenticator is calculated over the BU (Binding Update) message, HoA and CoA and is appended to the BU message. This authenticated BU message is finally sent to the CN. If the verification is successful, CN creates the binding of HoA and CoA in its binding cache and can send packets on the direct path to MN 100.

CoA Substitution

Figure 3:
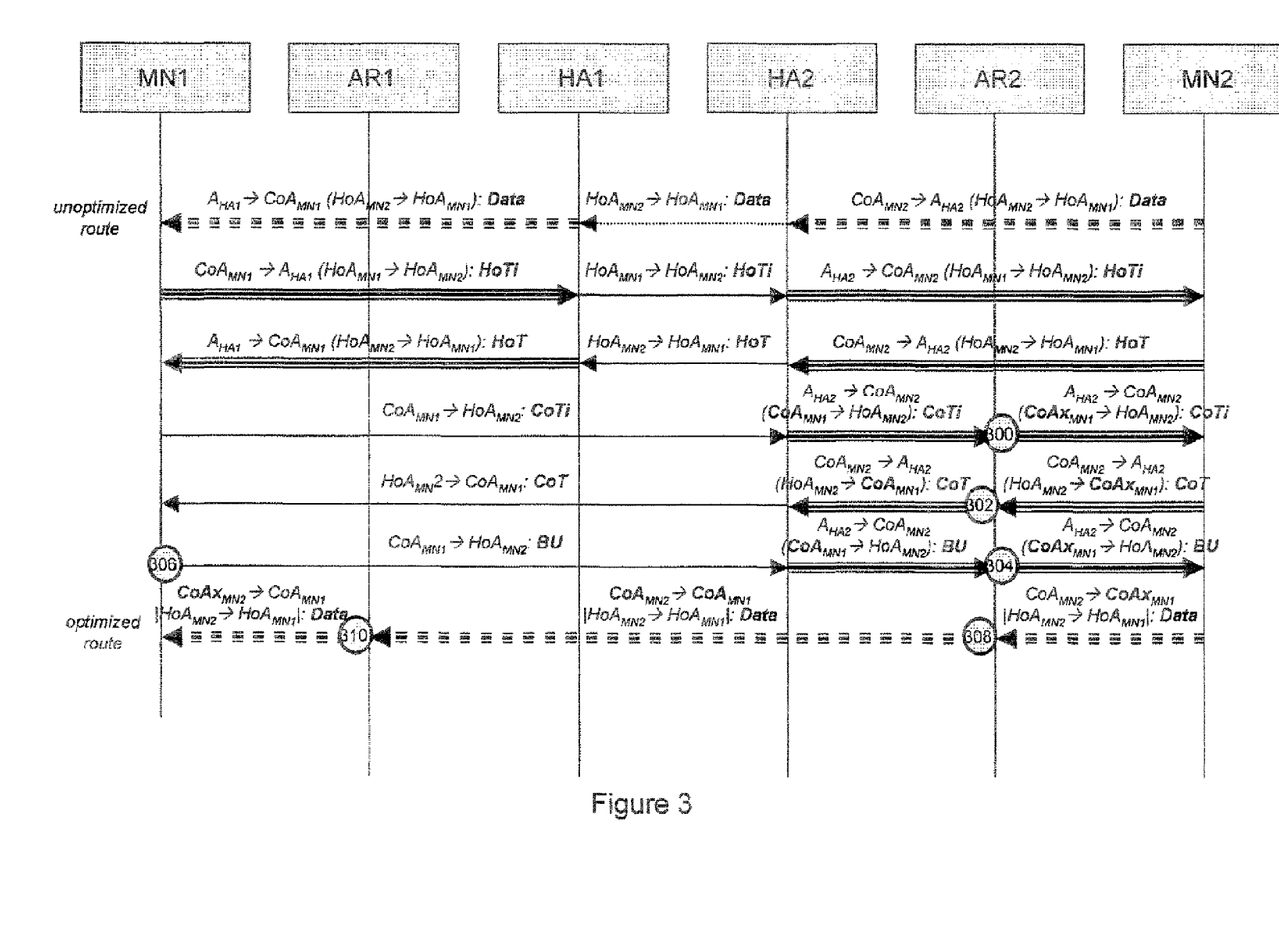
FIG. 3 shows CoA substitution in the return routability protocol with modified MN implementation.
Figure 4:
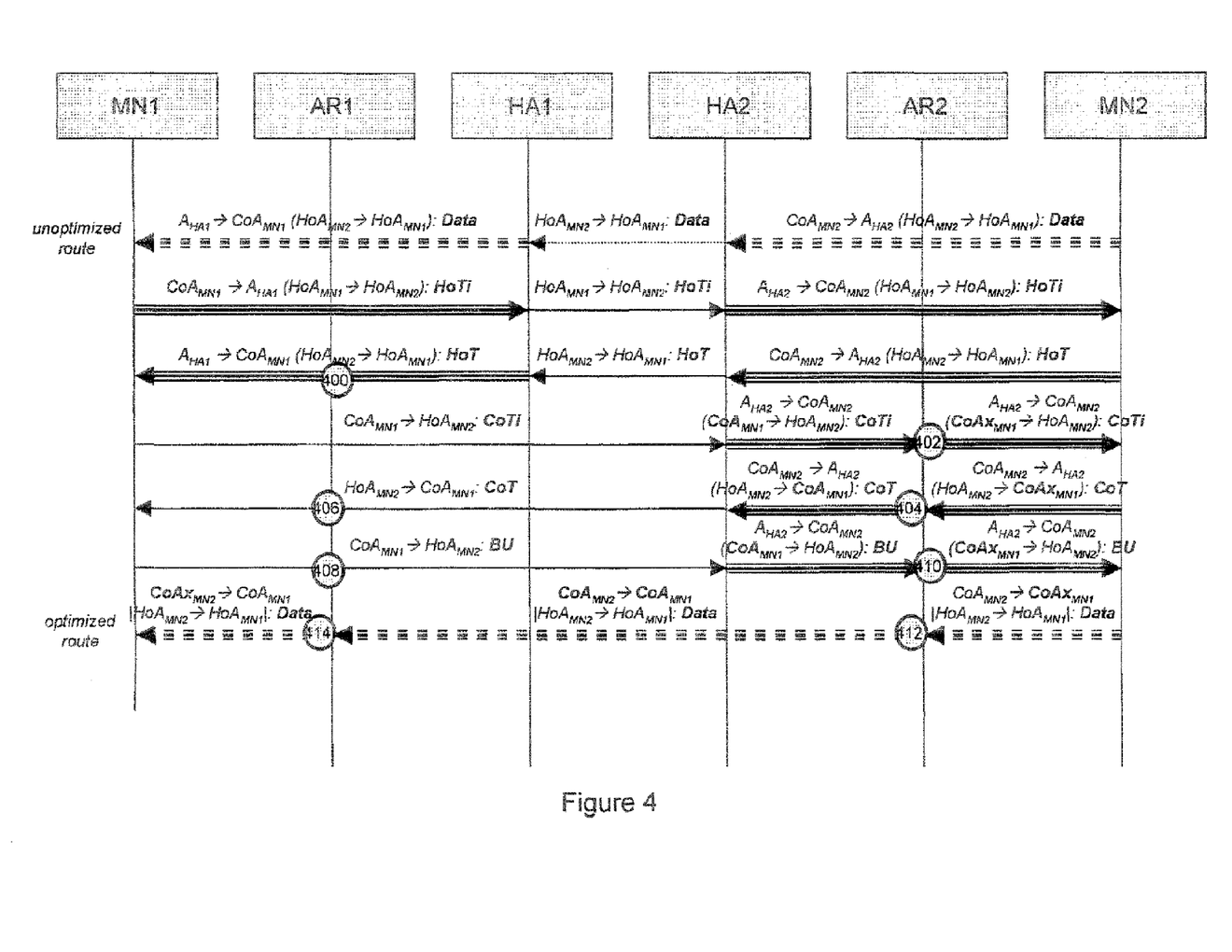
FIG. 4 shows CoA substitution in the return routability protocol with unmodified MN implementation.

FIG. 3 and FIG. 4 show two variants for the CoA substitution in the return routability protocol with and without the requirement for a modified MN implementation, respectively. The figures only show the establishment of an optimized route in one direction by MN1 100 (for traffic sent by MN2 106). To achieve bi-directional route optimization, the same procedure must be repeated in the other direction by MN2 106.

In FIG. 3, AR2 202 substitutes the $CoA_{MN1}$ in the source address field of the IP header of CoTi (300) and BU messages (304) with $CoAx_{MN1}$. Hence, the location of MN1 100 is hidden from MN2 106. AR2 202 substitutes $CoAx_{MN1}$ in the destination address field of CoT messages (302) and data packets (308) back to $CoA_{MN1}$ to enable the correct routing of those packets to MN1 100. Furthermore, AR1 200 can substitute $CoA_{MN2}$ in the source address field of the IP header of data packets (310) sent by MN2 106 to hide MN2's location from MN1 100.

Note that MN2 106 is only aware of $CoAx_{MN1}$ and hence calculates the care-of keygen token for the CoT message based on $CoAx_{MN1}$. Also the BU received from MN1 100 must be verified based on this address. Consequently, MN1 100 must be aware of $CoAx_{MN1}$ and must calculate the BU authenticator based on CoAxMN1 (instead of $CoA_{MN1}$) in 306 for successful BU authentication. Also, the BU message must contain $CoAx_{MN1}$ instead of $CoA_{MN1}$. This requires modification of the MN implementation.

FIG. 4 shows a variant, which prevents this modification, i.e., MN1 100 calculates the BU authenticator using $CoA_{MN1}$ as usual. To allow a successful verification at CN, AR1 200 recalculates the authenticator using $CoAx_{MN1}$ and substitutes the authenticator in the BU messages (408). Therefore, AR1 200 needs to know home and care-of keygen token, which it can determine from the earlier received HoT and CoT messages (400 and 406). They are stored together with the corresponding HoAs and CoAs, The replacement of the CoA can be done as in modified MN variant (402, 404, 410, 412 and 414).

Figure 7:
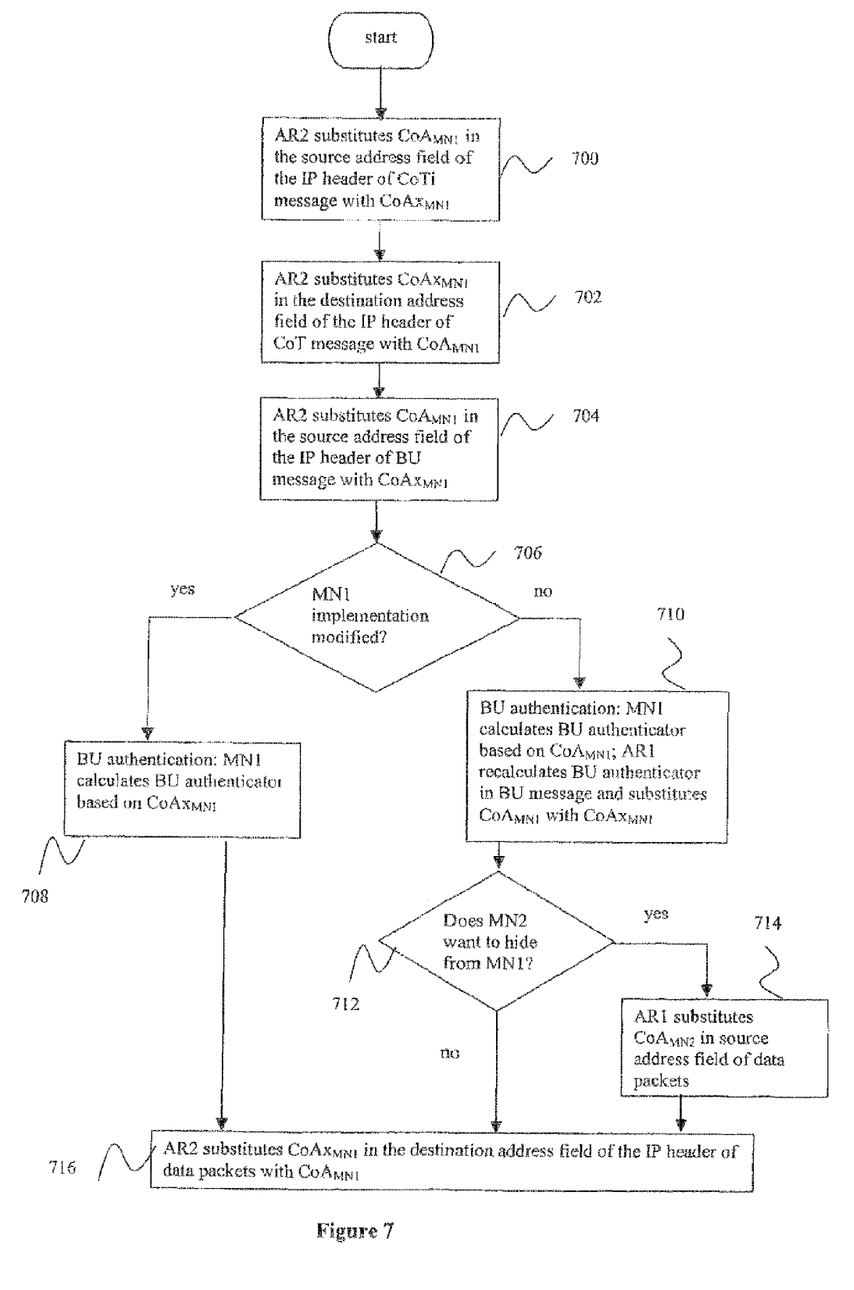
FIG. 7 is a flow chart for the CoA substitution.

FIG. 7 shows the method of FIGS. 3 and 4 in form of a flow diagram. In step 700 AR2 substitutes the care-of address of MN1 in the source address field of the IP header of the CoTi message with CoAx of MN1. Then in step 702 AR2 substitutes CoAx of MN1 in the destination address field of the IP header of the CoT message with the CoA of MN1. In step 704 AR2 substitutes the CoA of MN1 in the source address field of the IP header of the BU message with the CoAx of MN1.

If the mobile node implementation is modified (706), MN1 calculates, in step 708, the BU authenticator based on its CoAx for BU authentication before AR2 substitutes, in step 716, the CoAx of MN1 in the destination address field of the IP header of data packets with the CoA of MN1.

If the mobile node implementation is not modified (706), MN1 calculates, in step 710, the BU authenticator based on its CoA for BU authentication and AR1 recalculates the BU authenticator in the BU message and substitutes CoA with CoAx.

If MN2 wants to hide from MN1 (712), then AR1 substitutes, in step 714, the CoA of MN2 in the source address field of data packets before AR2 substitutes, in step 716, the CoAx of MN1 in the destination address field of the IP header of data packets with the CoA of MN1.

If MN2 does not want to hide its location from MN1 (712) AR2 substitutes, in step 716, the CoAx of MN1 in the destination address field of the IP header of data packets with the CoA of MN1.

Capability/Requirement Negotiation and its Use

In FIG. 3 and FIG. 4, AR2 is responsible for hiding the location of MN1 from MN2 and AR1 is responsible for hiding the location of MN2 from MN1, i.e., a MN must rely on the AR of the correspondent node. If this AR does not implement this invention, MN's location is revealed to CN. The first message that would reveal the location of a MN is the CoTi message. The problem is that MN and MN's AR may not know whether CN's AR implements this invention.

One solution is to ensure that all ARs support this invention. However, in some scenarios this may not be an option. In such scenarios, a possible solution is to let the ARs set a flag in HoT/HoTi messages that indicate the support of this invention and prevent sending the CoTi/CoT messages if CN's AR does not support this invention. However, this means that the CoTi/CoT and HoTi/HoT exchanges cannot run in parallel.

Again, two variants are proposed, one requires modified MNs and one does not require modified MNs.

Figure 5:
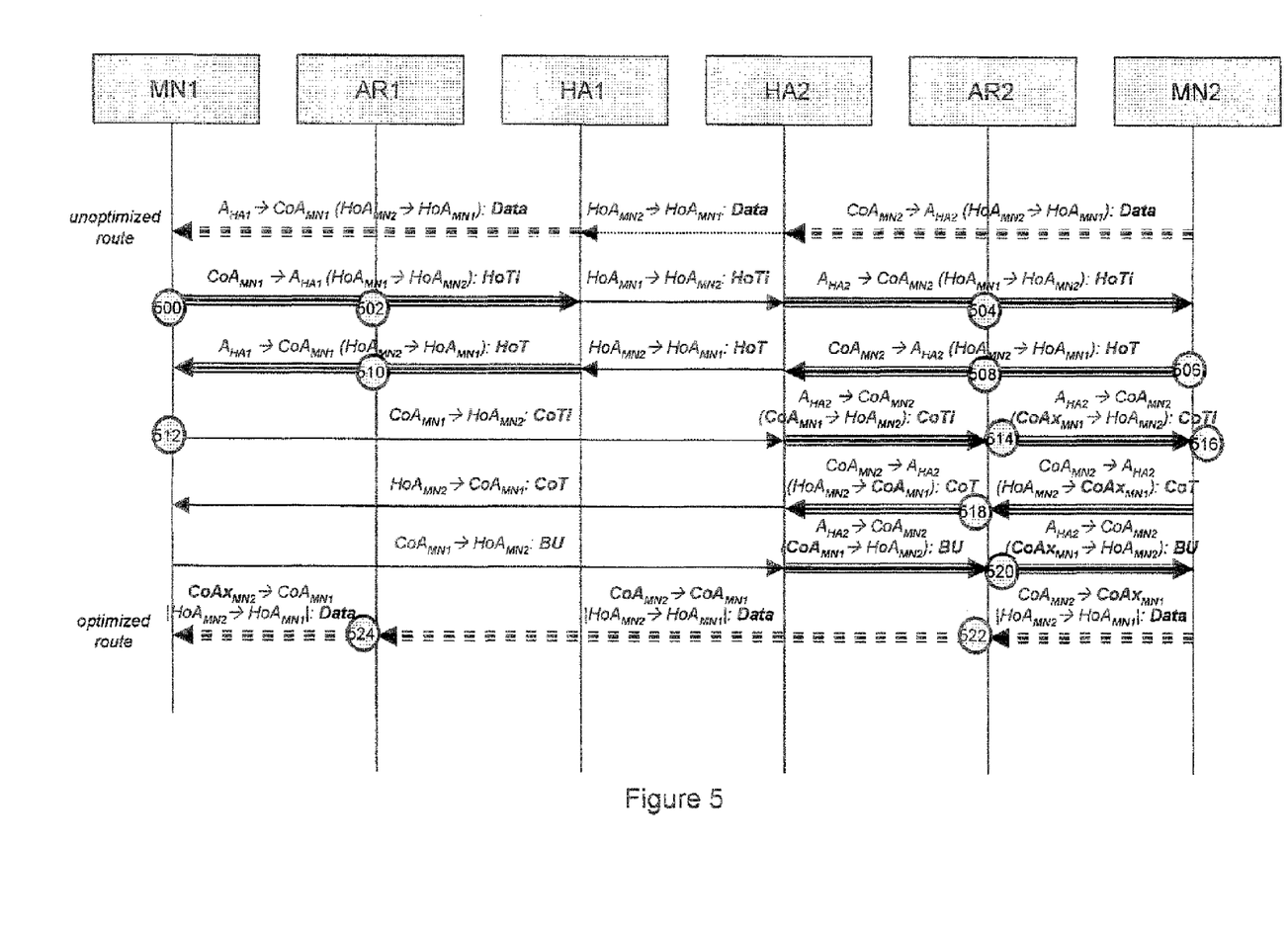
FIG. 5 illustrates capability/requirement negotiation and its use in the return routability protocol with modified MN implementation.

The first variant requires changes to MN implementations and is illustrated in FIG. 5. MN1 only sends (512) the CoTi if AR2 supports this invention or if MN1 does not require location privacy. Similarly, MN2 only sends (516) the CoT message if AR1 supports this invention or if MN2 does not require location privacy. AR2 (504) and MN2 (506) learn about MN1's requirements and AR1's LPROM (Location Privacy Route Optimisation Mode) capabilities when receiving the HoTi message, since MN1 sets a flag indicating its requirement for location privacy (500) and AR1 sets a flag indicating its support for LPROM (502). Likewise, MN2 sets a flag indicating its requirement for location privacy (506) and AR1 sets a flag indicating its support for LPROM (508). Hence, AR1 (510) and MN1 (512) learn about MN2's requirements and AR2's LPROM capabilities.

An issue is that ARs must know in which CoTi/CoT/BU messages and data packets they have to substitute CoAs (note that some MNs may not require location privacy). In 514 for instance, AR2 must know that it has to substitute $CoA_{MN1}$ in the IP header of the CoTi message in order to hide MN1's location from MN2. Therefore, a special privacy flag is set by MN1 (512) that marks a CoTi message, in which the CoA shall be substituted. AR2 can then store this CoA (514) and substitute this address in subsequent CoT (518), BU (520) and data packets (522). Hence, subsequent packets do not have to be marked with the privacy flag. Additionally, AR2 identifies data packets which require CoA substitution with $HoA_{MN1}$ in the type 2 routing header (522). This HoA is learned from the received HoTi message in 504. Likewise, AR1 identifies data packets which require CoA substitution by $HoA_{MN2}$ in the HoA option (524). It learns and stores this HoA from the received HoT message in 510.

The second variant does not require changes to MN implementations. This is achieved by letting the ARs drop CoTi/CoT message if CN's AR does not support this invention and location privacy is required, Hence, ARs maintain state information about other ARs' support for this invention and about the location privacy requirements of MNs. An AR can learn about the location privacy requirements of the correspondent MN by a flag, which is added to the HoTi/HoT messages by the HAs of the MNs. The HAs in turn are informed before (e.g., offline when subscribing to the Mobile IP service) about MN's location privacy requirements.

Figure 6:
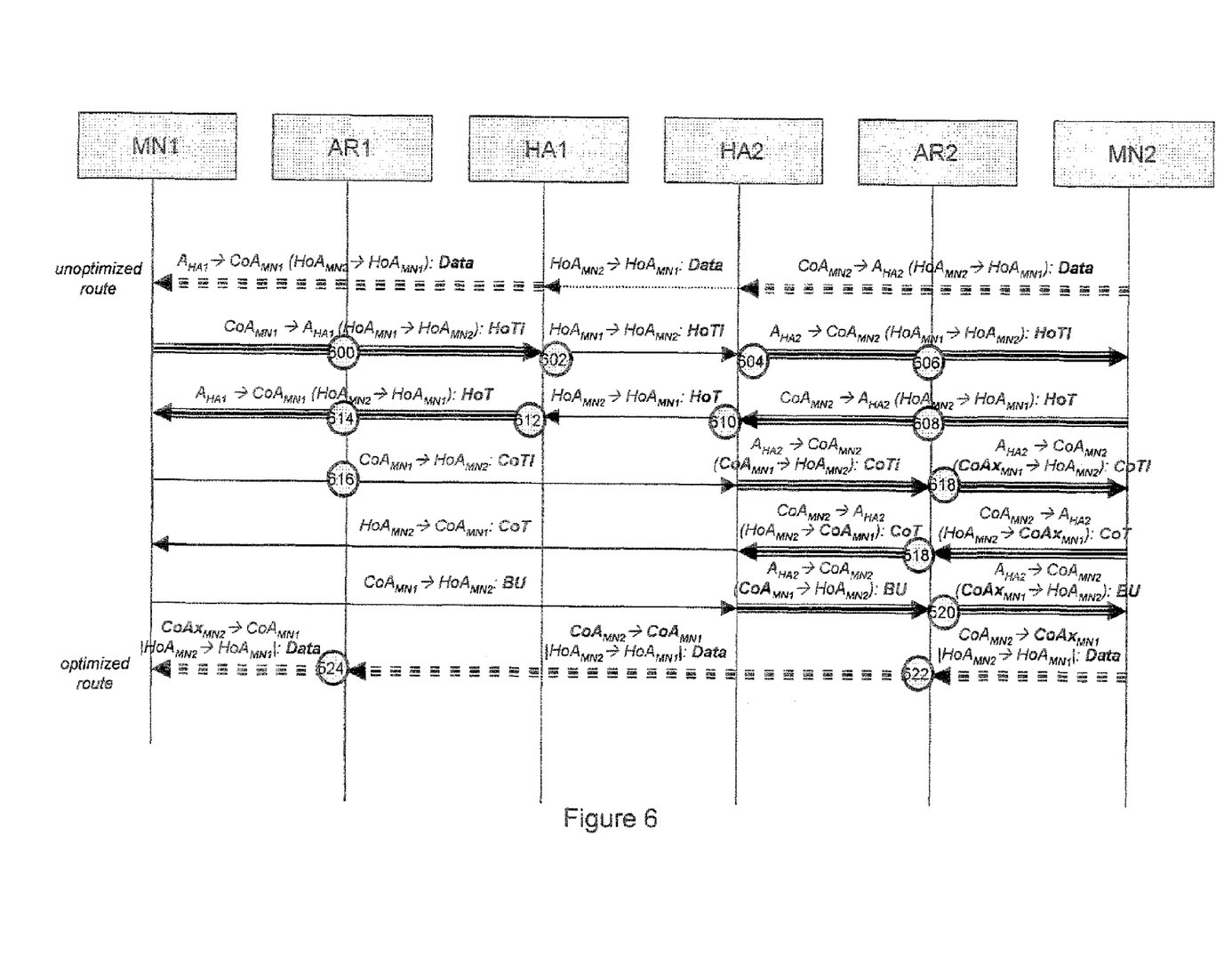
FIG. 6 shows capability/requirement negotiation and its use in the return routability protocol with unmodified MN implementation.

In FIG. 6 this variant is illustrated in detail. Now HA1 and HA2 set flags in the HoTi and HoT messages indicating MN1's and MN3's requirement for location privacy (602, 604, 610 and 612). As before, the ARs set flags indicating their support for LPROM (600 and 608). Hence, AR2 is able to learn about MN1's and MN2's requirements and AR1's LPROM capabilities in 606 and AR1 is able to learn about MN1's and MN2's requirements and AR2's LPROM capabilities in 614.

Instead of MN1, AR1 now checks if AR2 supports this invention and if MN1 does not require location privacy (616). If one of both conditions is true, it forwards the CoTi message; otherwise it drops the message. Likewise, AR2 checks if AR1 supports this invention and if MN2 does not require location privacy and subsequently forwards or drops the message accordingly (618).

The other procedures (e.g., 518-524 and the identification of packets and addresses that have to be substituted) are the same as in the first variant and hence are not explained again.

Handling Mobility

This invention requires ARs to maintain state information, e.g., AR2 must know the location privacy requirements of MN1 and the CoA to be substituted ($CoA_{MN1}$). If MN2 is moving to a new AR (AR2'), this AR must have this state information as well to be able to hide MN1's location from MN2. Two options are proposed to establish this state information in the new AR.

The first option is to transfer the state from AR2 to AR2' using a Context Transfer Protocol such as (J. Loughney, M. Nakhjiri, C. Perkins, R. Koodli, "Context Transfer Protocol", IETF RFC4067, July 2005).

The second option is that MN1 repeats the return routability procedure to introduce the state in AR2'. MN2 can trigger MN1 to start the return routability procedure by sending a Mobile IPv6 Binding Refresh Request (BRR) message to MN1. However, the repeated return routability procedure initiated by MN1 must be completed before the return routability procedure initiated by MN2 is completed in order to preserve location privacy (otherwise some packets might reach MN2, which contain the CoA of MN1). Note that the latter return routability procedure (initiated by MN2) must be executed anyway, since a node always has to execute the return routability procedure after a handover to update the binding in the CN.

Accessing Tunnelled Packets

This invention requires ARs to access packets in the Mobile IPv6 MN-HA tunnel (e.g., HoT/HoTi messages). If unprotected IP-in-IP tunnelling is used, this is no major issue (a minor issue might be the additional processing required at the AR, since it must peek into every tunnelled data packet). Mobile IPv6 has the option to encrypt the MN-HA tunnel with IPsec ESP (S. Kent, "IP Encapsulating Security Payload (ESP)", IETF RFC4303, December 2005). In this case the AR cannot peek into the tunnel without knowing the encryption key and hence cannot identify HoT/HoTi/CoT/CoTi/BU messages or data packets or substitute an address in the header of those packets. In this case it is assumed that the encryption key is transferred from the HA to the AR (The IETF is currently developing protocols to securely transfer keys for handovers to ARs. Once standardized, those protocols may be re-used to transfer the IPsec Security Association (SA) encryption key to the AR).

Security Considerations

MNs have to trust CNs' ARs that they really hide MN's location when they indicate so. This is not considered to be a big issue, since in today's networks MNs have to trust routers in the infrastructure anyway to some degree: routers could eavesdrop all traffic (as long as no end-to-end encryption is used), re-route all traffic to an attacker or drop all traffic.

However, one related issue is that it must be ensured that the flags in HoT/HoTi messages are not modified by an on-path attacker. Otherwise, an attacker could pretend that CN's AR supports this invention, although it does not. In this case MN would reveal its location to CN without knowing. Hence, if links cannot be assumed to be secure, messages (especially HoT/HoTi/CoT/CoTi messages) should be encrypted. This can be achieved either using link-layer or IP-layer security. E.g., the MN-HA tunnel should use IPsec ESP encryption for those messages. Usually the wireless link is the most probable location for an attack, since the infrastructure is usually well protected against attackers. If the attacker is located in the infrastructure, it can do almost anything anyway (see above), even if this invention is not used.

In another related issue, it must be prevented that a malicious MN cannot itself set the "AR support LPROM"-flag although the AR does not support LPROM. A possible solution to this problem is that ARs must sign messages, when they set the LPROM-support-flag, and that other ARs or CNs first have to verify the signature before trusting the contents of the message. However, this requires a PKI or pre-shared secrets across different administrative domains. E.g., if ARs share a secret with HAs and this secret is used by ARs to sign messages, HAs can verify the signature of the messages and can drop messages with LPROM-support-flag, if the verification was not successful. The shared secret can, e.g., be established by transferring the key from the HA to the AR, e.g., during network access authentication.

Another issue is whether the assumption is fair that the AR, which might be located in a different administrative domain than the HA, is able to access the packets tunnelled and encrypted between MN and HA (see above). This assumption is considered fair, since a similar situation exists in today's telecommunication networks: for a GPRS (General Packet Radio System) network the AR can be mapped to the SGSN (Serving GPRS Support Node) and the HA to the GGSN (Gateway GPRS Support Node). The SGSN is able to access packets exchanged between UE (User Equipment) and GGSN (even in the roaming case), because the traffic is encrypted between GGSN and SGSN and between RNC (Radio Network Controller) and UE only.

Support of Stationary (Legacy) Correspondent Nodes

If CN is not a Mobile IPv6 mobile node, the first-hop router of the CN must act as AR and hide MN's location from CN. The only difference to the mobile CN case is that no HA exist for CN and that no HA-CN tunnel exists. Hence, there is no HA that can set a flag about CN's location privacy requirements. But since a stationary node does not have a CoA to hide (i.e., no location privacy support required), this is no issue.

Another embodiment of the invention relates to the implementation of the various embodiments described above using hardware and software. It is recognised that the various methods mentioned above may be implemented where performed using computing devices (processors), as for example general purpose processors, Digital Signal Processors (DSP), Application Specific Integrated Circuits (ASIC), Field Programmable Gate Arrays (FPGA) or other programmable logic devices etc. The various embodiments of the invention may also be performed or embodied by a combination of these devices.

Further, the various embodiments of the invention may also be implemented by means of software modules which are executed by a processor or directly in hardware. Also, a combination of software modules and hardware implementation may be possible. The software modules may be stored in any kind of computer-readable storage medium, for example RAM, EEPROM, flash memory, registers, hard disks, CD-ROM, DVD, etc.

The invention claimed is:

1. A method for route optimization, with location privacy, of packet switched data transmissions between a first mobile node and a second mobile node via an access node in a mobile communication system, the method comprising the steps of:
   a) transmitting of reachability test packets and data packets by the first mobile node;
   b) analyzing the reachability test packets and data packets by the access node; and
   c) removing at least part of a care-of-address of the first mobile node with location information in the reachability test packets and data packets by the access node;
   wherein step c) comprises the following steps:
   d) deriving, by a transformation rule, a care-of-address without location information from the care-of-address with location information in the packets; and
   e) substituting the care-of-address with location information in the packets with the derived care-of-address without location information.

2. The method according to claim 1, further comprising the following step carried out by the access node after steps b) and c):
   f) substituting the care-of-address with location information back into the packets.

3. The method according to claim 1, wherein the transformation rule comprises adding a bit to the care-of-address with location information.

4. The method according to claim 1, further comprising the following steps:
   g) setting a first flag by the first mobile node in the reachability test packets, the first flag indicating a requirement for location privacy; and
   h) setting a second flag in the reachability test packets by the access node, the second flag indicating whether it is adapted to carry out steps b) and c).

5. The method according to claim 1, further comprising the following step when the data packets between the first mobile node and a home agent of the first mobile node are encrypted:
   i) transferring an encryption key from the home agent or the first mobile node to the access node.

6. The method according to claim 5, further comprising the following steps to verify an authenticity of the reachability test packets with the second flag set:
   j) signing the reachability test packets with the second flag by the access node; and
   k) verifying a signature of the reachability test packets by the home agent or the second mobile node.

7. The method according to claim 1, further comprising the steps of:
   l) transmitting of reachability test packets by the second mobile node;
   m) analyzing the reachability test packets transmitted by the second mobile node, by the access node; and
   n) removing at least part of a care-of-address of the second mobile node with location information in the reachability test packets transmitted by the second mobile node, by the access node.

* * * * *